Aug. 6, 1957 J. M. COOPER 2,802,167

SIGNAL VOLTAGE AMPLITUDE LIMITER

Filed April 15, 1952

Inventor:
James M. Cooper,
by Richard E. Hosley
His Attorney.

2,802,167

SIGNAL VOLTAGE AMPLITUDE LIMITER

James M. Cooper, Schenectady, N. Y., assignor to General Electric Company, a corporation of New York Application April 15, 1952, Serial No. 282,497

7 Claims. (Cl. 323—9)

Figures 1, 2:
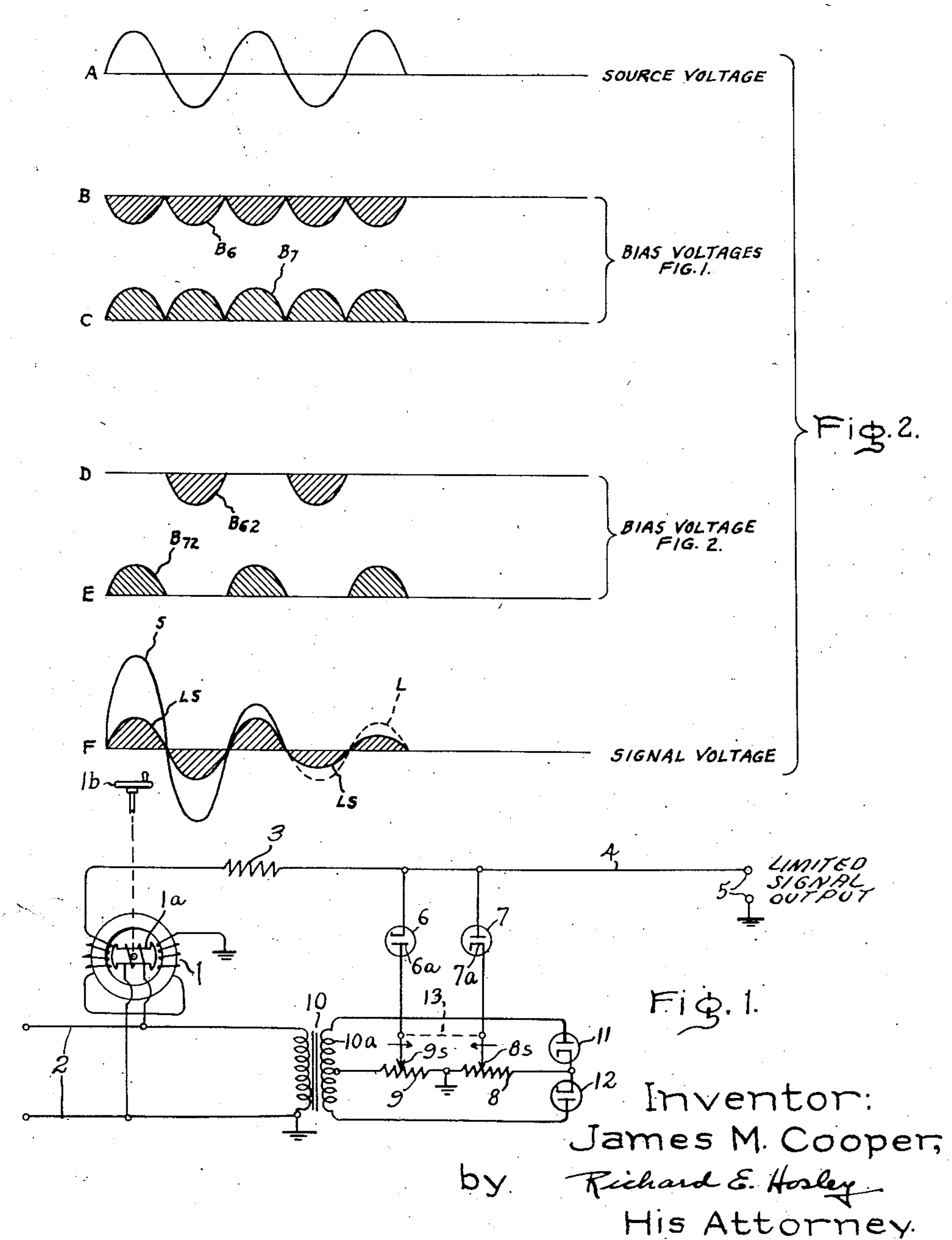

My invention relates to apparatus for limiting amplitude and of a modulated alternating signal voltage, and more particularly to an amplitude limiter substantially free from distortion.

In amplitude limiting circuits heretofore known, it is the usual practice to limit amplitude to a fixed predetermined maximum value, as by merely clipping off the voltage wave whenever it exceeds a predetermined value, which value remains fixed throughout each half cycle. Such simple clipping often results in considerable distortion of the wave shape, as when a sinusoidal wave is limited to a maximum instantaneous amplitude considerably below its actual peak value. In such case the limited output will be very nearly a square wave. In certain signal circuits such wave distortion cannot be tolerated.

Accordingly, therefore, it is a principal object of my invention to provide a new and improved amplitude limiter for alternating signal voltages which, to a large extent at least, preserves the original wave form while limiting its peak amplitude.

Another object of my invention is to provide a new and improved amplitude limiter for alternating current signal voltages, in which the biasing signal for the limiting means is synchronized with the signal voltage to be limited.

In carrying out my invention in one form, I provide a double diode limiter of the type in which a pair of oppositely poled biased diodes are connected in parallel circuit relation across a pair of signal voltage output terminals, and I bias the diodes by interposing between one terminal of each diode and one of the signal output terminals oppositely biasing potentials which vary in magnitude over each half cycle substantially in accordance with the wave shape of the signal voltage. More specifically, I supply to the limiting diodes opposite biasing potentials of pulsating unidirectional character wherein biasing pulses of fixed peak value are synchronized with the half cycles of the signal voltage and have a pulse shape corresponding to the wave shape of the signal voltage. Where such biasing potentials are supplied to the diodes by full wave rectification from a voltage source of the same phase and frequency as the signal voltage, the apparatus serves solely as a distortionless amplitude limiter, the biasing pulse frequency in this case being double the frequency of the signal voltage.

My invention itself will be more fully understood and its various objects and advantages further appreciated by referring now to the following detailed specification taken in conjunction with the accompanying drawing, in which Fig. 1 is a schematic circuit diagram of an amplitude limiter embodying my invention in one form; and Fig. 2 is a combined graphical representation of certain of the electrical operating characteristics of the circuit shown at Fig. 1.

Referring now to the drawing and particularly to Fig. 1, I have there shown an apparatus in which an amplitude modulated alternating signal voltage is derived through a signal generator 1 of the selsyn type from an alternating current supply source indicated as an alternating current line 2. The signal voltage from the signal generator 1 is applied through a current limiting resistor 3 and a conductor 4 to a pair of signal output terminals 5, one side of the line 2 and one of the terminals 5 being connected together through ground as indicated. By way of illustration I have shown the signal generator 1 as being of the selsyn type in which an alternating signal voltage of predetermined phase and frequency is modulated in amplitude in accordance with the position of a rotor member 1*a*, the rotor being controlled in position by a controlling member shown by way of example as a rotatable hand wheel 1*b*. It will of course be understood by those skilled in the art that other well known types of amplitude modulators may be utilized to derive a desired signal voltage from the alternating current supply line 2.

In order to limit the amplitude of the signal voltage supplied to the signal output terminals 5, I connect across these terminals in parallel circuit relation a pair of diodes 6 and 7 and provide means for variably biasing the diodes in opposite senses in accordance with the wave shape of the signal way itself. By way of illustration, I have shown the diodes 6 and 7 as being two-electrode electron discharge devices, but it will be understood by those skilled in the art that, if desired, other types of unilateral conducting devices, such as crystal diodes or metallic rectifiers, may be used.

The diodes 6 and 7 are biased by interposing between one terminal of each of the diodes and one of the output terminals 5 sources of pulsating unidirectional biasing potential of opposite polarity. More specifically, the cathode 7*a* of the diode 7 and the anode 6*a* of the diode 6 are connected to the grounded output terminal 5 through potentiometers 8 and 9, respectively. The instantaneous biasing voltages supplied to the diodes 6 and 7 by the potentiometers 9 and 8 are caused to vary over each half cycle of the signal voltage substantially in accordance with the wave shape of the signal voltage. This I accomplish by connecting the potentiometers 8 and 9 in series circuit relation in a full wave rectifier circuit supplied from the alternating current supply source 2 through a transformer 10. It will of course be understood by those skilled in the art that the rectified current supplied to the potentiometers 8 and 9 may, if desired, be derived from other alternating current supply sources having the same phase and frequency as the signal voltage itself. More specifically, the secondary winding 10*a* of the transformer 10 has its opposite terminals connected to the anodes of a pair of diodes 11 and 12 and its mid-point connected through the potentiometers 8 and 9 in series circuit relation to the cathodes of the diodes 11 and 12. The common terminal of the potentiometers 8 and 9 is connected to the grounded output terminal 5, and the potentiometer sliders 8*s* and 9*s* are connected, respectively, to the diodes 7 and 6. It will, of course, be understood by those skilled in the art that while I have shown the diodes 11 and 12 as two element-electron discharge devices, other suitable unilateral conducting devices such as crystal diodes or metallic rectifiers may be utilized if desired. The peak amplitude of the biasing potentials supplied to diodes 6 and 7 may be varied by controlling the sliders 8*s* and 9*s* on the potentiometers 8 and 9, and it is convenient that these sliders be mechanically interlocked so that they move together, as indicated by the dotted line 13 of the drawing. As indicated by arrows on the drawing, the potentiometer sliders 8*s* and 9*s* are mechanically so interconnected that they both move together either toward or away from their common grounded ends. The operation of the signal amplitude limiter shown at Fig. 1 will now be more fully understood by referring to Fig. 4 of the drawing, and more particularly to diagrams A, B, C and F of Fig. 4. Diagram A of Fig. 4 is a graphical representation of the alternating supply voltage appearing at the line 2, this voltage being fixed in amplitude and being of predetermined phase and frequency. The curve S of diagram F, Fig. 4, indicates a typical signal voltage output from the signal generator 1, this signal voltage corresponding in phase and frequency to the voltage of the source 2 but varying in amplitude. At curve $B_6$ of diagram B, Fig. 4, I have illustrated the pulsating unidirectional potential appearing across that portion of the potentiometer 9 between the slider and ground which is applied as a bias to the diode 6. The corresponding biasing potential of opposite polarity appearing at the potentiometer 8 and applied to the diode 7, is shown as curve $B_7$ on diagram C, Fig. 4. It will be observed that the pulsating unidirectional biasing potentials $B_6$ and $B_7$ are synchronized with half cycles of the supply voltage shown at diagram A, and that the pulse frequency of the biasing potentials is twice the frequency of the supply voltage and signal voltage, while the pulse shape of the biasing pulses, being sinusoidal as illustrated, corresponds to the sinusoidal wave shape of the signal voltage and supply voltage. The biasing pulses are of fixed peak amplitude.

It will now be evident to those skilled in the art that in operation, whenever the instantaneous value of the alternating signal voltage at any point in a half cycle exceeds the instantaneous value of the biasing potential at the same instant, either the diole 6 or the diode 7 becomes conductive (depending upon the instantaneous polarity of the signal voltage) thereby to shunt the signal output terminals and to limit the voltage thereacross to the instantaneous value of the biasing potential. In effect, this means that the voltage between the signal output terminals 5 during any half cycle cannot be greater at any instant than the instantaneous value of the bias voltage on that diode, 6 or 7, which is poled to shunt signal voltages of the then existing polarity. Thus, the amplitude limit imposed upon the signal voltage is not a fixed unvarying limit, but is a limit which varies sinusoidally in the manner shown at diagrams B and C of Fig. 4. This is more clearly illustrated at diagram F of Fig. 4, where the curve S illustrates a signal voltage varying in amplitude and generated, for example, in the signal generator 1, while the curve LS illustrates the limited signal voltage as it appears at the output terminals 5. The dotted curve portion L at diagram F indicates the limiting value of the bias voltage during two half cycles when this limiting value is not attained by the applied signal voltage.

What I claim as new and desire to secure by Letters Patent of the United States is:

1. In an apparatus for limiting the amplitude of an amplitude modulated alternating signal voltage of predetermined frequency and wave shape, without distorting said wave shape, a pair of output terminals, means supplying said signal voltage to said terminals, a pair of diodes connected across said terminals in oppositely poled parallel circuit relation, and means for supplying between one terminal of each of said diodes and one of said output terminals opposite pulsating unidirectional biasing potentials synchronized with half cycles of said signal voltage, said biasing potentials being of constant peak amplitude and having a pulse frequency equal to twice said predetermined frequency and a pulse shape substantially the same as said predetermined wave shape.

2. In an apparatus for limiting the amplitude of an amplitude modulated alternating signal voltage of substantially sinusoidal wave shape and predetermined frequency, without distorting said wave shape, derived from a substantially sinusoidal alternating voltage source, a pair of output terminals, means supplying said signal voltage to said terminals, a pair of unilateral conducting devices connected across said terminals in oppositely poled parallel circuit relation, and means for deriving from said voltage source and supplying to said unilateral conducting devices in synchronism with said signal voltage opposite pulsating unidirectional biasing potentials of substantially sinusoidal pulse shape and constant peak amplitude, said biasing potentials having a pulse frequency double the frequency of said signal voltage.

3. In an apparatus for limiting the amplitude of an amplitude modulated alternating signal voltage of predetermined frequency and wave shape, without distorting said wave shape a pair of output terminals, means supplying said signal voltage to said terminals, a pair of unilateral conducting devices connected across said terminals in oppositely poled parallel circuit relation, means including a full wave rectifier for deriving from an alternating voltage source in phase with said signal voltage a pulsating unidirectional voltage having a pulse shape substantially the same as said predetermined wave shape and having a constant peak amplitude, and means utilizing said pulsating unidirectional voltage to oppositely bias said unilateral conducting devices.

4. In an apparatus for limiting the amplitude of an amplitude modulated alternating signal voltage derived from a source of alternating voltage of fixed amplitude, without distorting the wave shape of said signal voltage, a pair of output terminals, means supplying said signal voltage to said terminals, a pair of potentiometers, full wave rectifying means connecting said potentiometers to said voltage supply source in series circuit relation, said rectifying means supplying across said potentiometers pulsating unidirectional potentials synchronized with half cycles of said signal voltage, said pulsating potentials having a frequency double the frequency of said signal voltage and a pulse shape corresponding to the wave shape of said signal voltage and being of constant peak amplitude, and a pair of unilateral conducting devices connected in oppositely poled parallel circuit relation across said output terminals each in series circuit relation with at least a portion of one of said potentiometers respectively, said potentiometers being connected to apply opposite pulsating unidirectional biasing potentials to said unilateral conducting devices.

5. In an apparatus for continuously limiting the amplitude of each incremental value of a variable peak amplitude alternating current signal voltage of predetermined wave shape and frequency, without distorting said wave shape, to that of a constant peak amplitude reference signal having the same wave shape as each half cycle of the alternating current and being twice the frequency thereof, a pair of unilateral conducting devices in circuit to receive said alternating current signal and being oppositely poled whereby one of said devices is adapted to divert the values of said signal of one polarity and the other of said devices is adapted to divert the values of said signal of the other polarity, means for biasing each of said unilateral devices with said reference signal in opposition to and in synchronism with the values of said signals being diverted therethrough irrespective of whether said signal is received in one phase or the opposite phase.

6. In an apparatus for limiting the amplitude of each instantaneous value of an input alternating current signal, without distorting the wave shape of said input signal to the corresponding instantaneous value of a cyclically varying reference signal, where said alternating current signal has a predetermined wave shape and frequency and is adapted to be amplitude modulated and received in one phase or the opposite phase, and said reference signal is of twice the frequency of said input signal and having the wave shape of every odd cycle thereof substantially the same as every odd half cycle of said input signal and in synchronism therewith, and having the wave shape of every even cycle thereof substantially the same as every even half cycle of said input signal and in synchronism therewith, and all of said odd cycles of the reference signal thereof having substantially the same peak amplitude, and all of said even cycles thereof having the same peak amplitudes; a first unidirectional conducting device in a circuit for receiving said alternating current signal and adapted to divert half cycles of one polarity therethrough, a second unidirectional device in circuit to receive said alternating current signal and adapted to divert half cycles of the opposite polarity therethrough, and means for biasing said first unidirectionally conducting device with said reference signal in opposition to conduction therethrough, and means for biasing said second unidirectionally conducting device with said reference signal in opposition to conduction therethrough.

7. In an apparatus for limiting the amplitude of a variable amplitude signal of predetermined waveform without distortion, a first distortionless limiter responsive to all unidirectional components of said signal of one polarity for amplitude limiting said components, a second distortionless limiter responsive to all unidirectional components of said signal of the opposite polarity for amplitude limiting said opposite polarity components, each of said limiters including a unidirectional conducting device poled to receive said unidirectional components and a means for degeneratively biasing said device with a cyclically varying unidirectional control signal of twice the frequency of said variable amplitude signal, with each cycle of said control signal being in synchronism with a corresponding half cycle of said variable amplitude signal and having substantially the same predetermined waveform and a constant peak amplitude.

References Cited in the file of this patent

UNITED STATES PATENTS

| | | |
|---|---|---|
| 2,295,207 | Gabrilovitch | Sept. 8, 1942 |
| 2,338,412 | Dallos | Jan. 4, 1944 |
| 2,485,731 | Gruen | Oct. 25, 1945 |
| 2,391,532 | Wilmotte | Dec. 25, 1945 |
| 2,471,418 | Earp | May 31, 1949 |
| 2,529,055 | Smoot | Nov. 7, 1950 |
| 2,554,905 | Hawkins | May 29, 1951 |